(12) United States Patent
Dubois et al.

(10) Patent No.: US 10,074,874 B2
(45) Date of Patent: Sep. 11, 2018

(54) ADDITIVES TO IMPROVE ELECTROLYTE PERFORMANCE IN LITHIUM ION BATTERIES

(71) Applicant: Solvay SA, Brussels (BE)

(72) Inventors: Charles J. Dubois, Orange, TX (US); Viacheslav A. Petrov, Hockessin, DE (US); Mark Gerrit Roelofs, Earleville, MD (US)

(73) Assignee: Solvay SA, Brussels (BE)

( * ) Notice: Subject to any disclaimer, the term of this patent is extended or adjusted under 35 U.S.C. 154(b) by 726 days.

(21) Appl. No.: 14/404,169

(22) PCT Filed: Mar. 8, 2013

(86) PCT No.: PCT/US2013/029815
§ 371 (c)(1),
(2) Date: Nov. 26, 2014

(87) PCT Pub. No.: WO2013/180781
PCT Pub. Date: Dec. 5, 2013

(65) Prior Publication Data
US 2015/0140444 A1 May 21, 2015

Related U.S. Application Data

(60) Provisional application No. 61/654,184, filed on Jun. 1, 2012.

(51) Int. Cl.
| | | |
|---|---|---|
| *H01M 10/0569* | (2010.01) | |
| *H01M 4/505* | (2010.01) | |
| *H01M 10/0525* | (2010.01) | |
| *H01M 10/0567* | (2010.01) | |
| *H01M 4/131* | (2010.01) | |
| *H01M 4/525* | (2010.01) | |
| *H01M 4/485* | (2010.01) | |
| *H01M 4/587* | (2010.01) | |
| *H01M 4/02* | (2006.01) | |

(52) U.S. Cl.
CPC ....... *H01M 10/0569* (2013.01); *H01M 4/131* (2013.01); *H01M 4/505* (2013.01); *H01M 4/525* (2013.01); *H01M 10/0525* (2013.01); *H01M 10/0567* (2013.01); *H01M 4/485* (2013.01); *H01M 4/587* (2013.01); *H01M 2004/028* (2013.01); *H01M 2300/0034* (2013.01); *H01M 2300/0037* (2013.01)

(58) Field of Classification Search
CPC ........ H01M 10/0569; H01M 10/0567; H01M 10/0525; H01M 4/505; H01M 4/131; H01M 4/525; H01M 4/485; H01M 4/587; H01M 2300/0034; H01M 2300/0037
See application file for complete search history.

(56) References Cited

U.S. PATENT DOCUMENTS

| | | |
|---|---|---|
| 2,824,141 A | 2/1958 | Zisman et al. |
| 3,006,964 A | 10/1961 | Oesterling |
| 5,273,840 A | 12/1993 | Dominey |
| 5,352,548 A | 10/1994 | Fujimoto et al. |
| 5,446,134 A | 8/1995 | Armand et al. |
| 5,534,634 A | 7/1996 | Appel et al. |
| 5,561,232 A | 10/1996 | Hao et al. |
| 5,659,062 A | 8/1997 | Yokoyama et al. |
| 5,738,957 A | 4/1998 | Amine et al. |
| 5,847,156 A | 12/1998 | Eldin et al. |
| 5,847,188 A | 12/1998 | Yokoyama et al. |
| 5,925,283 A | 7/1999 | Taniuchi et al. |
| 5,962,166 A | 10/1999 | Ein-Eli et al. |
| 6,168,878 B1 | 1/2001 | Fauteux et al. |
| 6,337,158 B1 | 1/2002 | Nakajima et al. |
| 6,420,069 B2 | 7/2002 | Amine et al. |
| 6,465,135 B1 | 10/2002 | Nishimura et al. |
| 6,495,293 B1 | 12/2002 | Arai et al. |
| 6,506,516 B1 | 1/2003 | Wietelmann et al. |
| 6,506,524 B1 | 1/2003 | McMillan et al. |
| 6,534,220 B2 | 3/2003 | Garbe |
| 6,680,145 B2 | 1/2004 | Obrovac et al. |
| 6,723,473 B1 | 4/2004 | Oura et al. |
| 6,878,492 B2 | 4/2005 | Takeuchi et al. |
| 6,958,198 B2 | 10/2005 | Iwamoto et al. |
| 6,964,828 B2 | 11/2005 | Lu et al. |
| 7,026,070 B2 | 4/2006 | Noguchi et al. |
| 7,078,128 B2 | 7/2006 | Lu et al. |
| 7,229,718 B2 | 6/2007 | Yamaguchi et al. |
| 7,303,840 B2 | 12/2007 | Thackeray et al. |
| 7,312,001 B2 | 12/2007 | Kim et al. |
| 7,381,496 B2 | 6/2008 | Onnerud et al. |

(Continued)

FOREIGN PATENT DOCUMENTS

| | | |
|---|---|---|
| CN | 101617432 A | 12/2009 |
| CN | 102263292 A | 11/2011 |

(Continued)

OTHER PUBLICATIONS

US 8,372,547, 02/2013, Koh et al. (withdrawn)
Cresce et al., Electrolyte Additive in Support of 5 V Li Ion Chemistry, Journal of the Electrochemical Society, vol. 158, No. 3 (2011), pp. A337-A342.
International Search Report, PCT Application No. PCT/US2013/029815, dated Dec. 1, 2014.
IPRP, PCT Application No. PCT/US2013/029815, dated Dec. 2, 2014.
Bessler et al., "Boron Complexes with Dicarboxylic Acids", Zeitschrift fuer Naturforschung, Teil B: Anorganische chemie, Organische Chemie, vol. 37B, Issue 8, pp. 1020-1025, Journal, 1982, CODEN: ZNBAD2, issn: 0340-5087. See also English abstract.

(Continued)

*Primary Examiner* — Laura S Weiner
(74) *Attorney, Agent, or Firm* — Osha Liang LLP

(57) ABSTRACT

A lithium ion battery that has a 5 V stabilized manganese cathode and a nonaqueous electrolyte comprising a phosphate additive is described. The lithium ion battery operates with a high voltage cathode (i.e. up to about 5 V) and has improved cycling performance at high temperature.

16 Claims, 1 Drawing Sheet

(56) References Cited

U.S. PATENT DOCUMENTS

| | | | |
|---|---|---|---|
| 7,416,813 B2 | 8/2008 | Fujihara et al. |
| 7,468,223 B2 | 12/2008 | Thackeray et al. |
| 7,491,471 B2 | 2/2009 | Yamaguchi et al. |
| 7,541,114 B2 | 6/2009 | Ohzuku et al. |
| 7,635,536 B2 | 12/2009 | Johnson et al. |
| 7,718,319 B2 | 5/2010 | Manthiram et al. |
| 7,754,389 B2 | 7/2010 | Yamaguchi et al. |
| 7,790,308 B2 | 9/2010 | Johnson et al. |
| 7,981,544 B2 | 7/2011 | Morishima |
| 8,092,942 B1 | 1/2012 | Chen et al. |
| 8,097,368 B2 | 1/2012 | Chiga et al. |
| 8,158,285 B2 | 4/2012 | Im et al. |
| 8,178,246 B2 | 5/2012 | Shima |
| 8,216,726 B2 | 7/2012 | Wakita et al. |
| 8,277,973 B2 | 10/2012 | Kawashima |
| 8,288,039 B2 | 10/2012 | Im et al. |
| 8,367,254 B2 | 2/2013 | Im et al. |
| 8,372,549 B2 | 2/2013 | Im et al. |
| 8,389,160 B2 | 3/2013 | Venkatachalam et al. |
| 8,394,534 B2 | 3/2013 | Lopez et al. |
| 8,415,056 B2 | 4/2013 | Koh et al. |
| 8,435,680 B2 | 5/2013 | Park et al. |
| 8,455,143 B2 | 6/2013 | Lee et al. |
| 8,535,832 B2 | 7/2013 | Kandasamy et al. |
| 8,518,525 B2 | 8/2013 | Dennes et al. |
| 8,530,099 B2 | 9/2013 | Chen et al. |
| 8,546,024 B2 | 10/2013 | Jeon et al. |
| 8,557,447 B2 | 10/2013 | Lee |
| 8,586,245 B2 | 11/2013 | Yamaguchi et al. |
| 8,668,838 B2 | 3/2014 | Takahashi et al. |
| 8,673,506 B2 | 5/2014 | Jeon et al. |
| 8,715,852 B2 | 5/2014 | Kim et al. |
| 8,715,865 B2 | 5/2014 | Xu et al. |
| 8,735,005 B2 | 5/2014 | Holstein et al. |
| 8,795,903 B2 | 8/2014 | Smart et al. |
| 8,871,384 B2 | 10/2014 | Koh et al. |
| 8,877,389 B2 | 11/2014 | Koh et al. |
| 8,945,781 B2 | 2/2015 | Chiga et al. |
| 8,946,452 B2 | 2/2015 | Dietz et al. |
| 9,093,718 B2 | 7/2015 | Dietz et al. |
| 9,105,943 B2 | 8/2015 | Jeon et al. |
| 9,246,191 B2 | 1/2016 | Jeon et al. |
| 2003/0180618 A1 | 9/2003 | Inoue et al. |
| 2003/0190529 A1 | 10/2003 | Kim et al. |
| 2004/0157133 A1 | 8/2004 | Kim et al. |
| 2005/0196670 A1 | 9/2005 | Yamaguchi et al. |
| 2006/0051671 A1 | 3/2006 | Thackeray et al. |
| 2006/0115739 A1 | 6/2006 | Yamaguchi et al. |
| 2006/0147808 A1 | 7/2006 | Xiao et al. |
| 2006/0154149 A1 | 7/2006 | Arai et al. |
| 2006/0216612 A1 | 9/2006 | Jambunathan et al. |
| 2007/0042267 A1 | 2/2007 | Kim et al. |
| 2007/0148540 A1 | 6/2007 | Chiga et al. |
| 2007/0178379 A1 | 8/2007 | Tamura et al. |
| 2007/0190412 A1 | 8/2007 | Chiga et al. |
| 2007/0224504 A1 | 9/2007 | Kita et al. |
| 2007/0287071 A1 | 12/2007 | Chiga et al. |
| 2008/0102375 A1 | 5/2008 | Shima |
| 2008/0131772 A1 | 5/2008 | Jambunathan et al. |
| 2008/0145763 A1 | 6/2008 | Koh et al. |
| 2008/0292971 A1 | 11/2008 | Iharu et al. |
| 2009/0142663 A1 | 6/2009 | Takeuchi et al. |
| 2009/0253044 A1 | 10/2009 | Nogi et al. |
| 2009/0253048 A1 | 10/2009 | Shima |
| 2009/0305144 A1* | 12/2009 | Koh .......... H01M 10/0567 429/332 |
| 2010/0035162 A1* | 2/2010 | Chiga .......... H01M 10/052 429/343 |
| 2010/0047695 A1* | 2/2010 | Smart .......... H01M 10/0567 429/307 |
| 2010/0062344 A1 | 3/2010 | Koh et al. |
| 2010/0081062 A1 | 4/2010 | Chiga et al. |
| 2010/0108934 A1 | 5/2010 | Flynn et al. |
| 2010/0119956 A1 | 5/2010 | Tokuda et al. |
| 2010/0183926 A1 | 7/2010 | Kim et al. |
| 2010/0190055 A1 | 7/2010 | Khakhalev |
| 2010/0266904 A1 | 10/2010 | Jeon et al. |
| 2010/0266905 A1 | 10/2010 | Jeon et al. |
| 2010/0273064 A1 | 10/2010 | Jeon et al. |
| 2011/0008684 A1 | 1/2011 | Jeon et al. |
| 2011/0111305 A1 | 5/2011 | Jeon et al. |
| 2011/0111307 A1 | 5/2011 | Koh et al. |
| 2011/0123872 A1 | 5/2011 | Koh et al. |
| 2011/0143217 A1 | 6/2011 | Arora et al. |
| 2011/0171539 A1 | 7/2011 | Patoux et al. |
| 2011/0195317 A1 | 8/2011 | Koh et al. |
| 2011/0256458 A1 | 10/2011 | Tani |
| 2011/0311866 A1 | 12/2011 | Lim et al. |
| 2012/0009485 A1 | 1/2012 | Xu et al. |
| 2012/0136175 A1 | 5/2012 | Fuseya et al. |
| 2012/0149852 A1 | 6/2012 | Dennes et al. |
| 2012/0164519 A1 | 6/2012 | Lee et al. |
| 2012/0164542 A1 | 6/2012 | Iwaya |
| 2012/0196190 A1 | 8/2012 | Jeon et al. |
| 2012/0208093 A1 | 8/2012 | Ihara et al. |
| 2012/0219866 A1 | 8/2012 | Onuki et al. |
| 2012/0301795 A1 | 11/2012 | Kaneko et al. |
| 2012/0321965 A1 | 12/2012 | Fujikawa et al. |
| 2012/0328938 A1 | 12/2012 | Geiculescu et al. |
| 2013/0029230 A1 | 1/2013 | Park et al. |
| 2013/0029231 A1 | 1/2013 | Jeon et al. |
| 2013/0122373 A1 | 5/2013 | Tamura et al. |
| 2013/0149602 A1 | 6/2013 | Luski et al. |
| 2013/0189591 A1 | 7/2013 | Nishimura et al. |
| 2013/0309564 A1 | 11/2013 | Yoshida et al. |
| 2013/0337342 A1 | 12/2013 | Hallac et al. |
| 2014/0017559 A1 | 1/2014 | Kawasaki et al. |
| 2014/0017572 A1 | 1/2014 | Uehara et al. |
| 2014/0045002 A1 | 2/2014 | Yokoyama et al. |
| 2014/0045034 A1 | 2/2014 | Kondo et al. |
| 2014/0045049 A1 | 2/2014 | Iyori et al. |
| 2014/0045050 A1 | 2/2014 | Hattori et al. |
| 2014/0045051 A1 | 2/2014 | Hattori et al. |
| 2014/0045057 A1 | 2/2014 | Tode et al. |
| 2014/0045077 A1 | 2/2014 | Minami et al. |
| 2014/0079990 A1 | 3/2014 | Yanagida et al. |
| 2014/0120415 A1 | 5/2014 | Surugo et al. |
| 2014/0141323 A1 | 5/2014 | Saruwatari et al. |
| 2014/0178772 A1 | 6/2014 | Jeong et al. |
| 2014/0227584 A1 | 8/2014 | Holstein et al. |
| 2014/0234701 A1 | 8/2014 | Tanaka et al. |
| 2014/0243561 A1 | 8/2014 | Mueller et al. |
| 2014/0248529 A1 | 9/2014 | Chen et al. |
| 2014/0302401 A1 | 10/2014 | Burkhardt et al. |
| 2014/0302402 A1 | 10/2014 | Chen et al. |
| 2014/0308578 A1 | 10/2014 | Onizuka et al. |
| 2014/0322579 A1 | 10/2014 | Mitsuhashi et al. |
| 2014/0322616 A1 | 10/2014 | Onizuka et al. |
| 2014/0329141 A1 | 11/2014 | Onizuka et al. |
| 2015/0049642 A1 | 2/2015 | Eng et al. |
| 2015/0086862 A1 | 3/2015 | Osada et al. |
| 2015/0111112 A1 | 4/2015 | Petrov et al. |
| 2015/0171467 A1 | 6/2015 | Dubois et al. |
| 2015/0303521 A1 | 10/2015 | Sasaki et al. |
| 2016/0049691 A1 | 2/2016 | Suzuki et al. |
| 2016/0087307 A1 | 3/2016 | Burkhardt et al. |

FOREIGN PATENT DOCUMENTS

| | | |
|---|---|---|
| CN | 102569888 A | 7/2012 |
| CN | 102751533 A | 10/2012 |
| CN | 102790236 A | 11/2012 |
| CN | 102983358 A | 3/2013 |
| CN | 103117414 A | 5/2013 |
| CN | 103165939 A | 6/2013 |
| CN | 103682440 A | 3/2014 |
| CN | 103730688 A1 | 4/2014 |
| CN | 103943884 A1 | 7/2014 |
| CN | 103972588 A1 | 8/2014 |
| EP | 0924788 A1 | 6/1999 |
| EP | 1890357 A1 | 2/2008 |
| EP | 2037029 A1 | 3/2009 |
| EP | 2365573 A2 | 9/2011 |
| EP | 2378602 A1 | 10/2011 |

(56) References Cited

FOREIGN PATENT DOCUMENTS

| | | |
|---|---|---|
| EP | 2535975 A1 | 12/2012 |
| EP | 2571089 B1 | 3/2013 |
| EP | 2626943 A1 | 8/2013 |
| EP | 2339684 A | 9/2013 |
| JP | 62290072 A | 12/1987 |
| JP | 620719 A | 1/1994 |
| JP | H9-199168 A | 7/1997 |
| JP | 10116627 A | 6/1998 |
| JP | 8298134 A | 11/1998 |
| JP | 1186901 A | 3/1999 |
| JP | H11-233140 A | 8/1999 |
| JP | 2000188128 A | 7/2000 |
| JP | 2000-235857 A | 8/2000 |
| JP | 2001345120 A | 12/2001 |
| JP | 2002-042814 A | 2/2002 |
| JP | 2002124263 A | 4/2002 |
| JP | 3311611 B2 | 8/2002 |
| JP | 2003100342 A | 4/2003 |
| JP | 3444607 B2 | 9/2003 |
| JP | 2003-282055 A | 10/2003 |
| JP | 2003282138 A | 10/2003 |
| JP | 2004047131 A | 2/2004 |
| JP | 2004281185 A | 7/2004 |
| JP | 2004241339 A | 8/2004 |
| JP | 2005078820 A | 3/2005 |
| JP | 2005293920 A | 10/2005 |
| JP | 2006032300 A | 2/2006 |
| JP | 2006140115 A | 6/2006 |
| JP | 2006172721 A | 6/2006 |
| JP | 2006172950 A | 6/2006 |
| JP | 2006210022 A | 8/2006 |
| JP | 2006331866 A | 12/2006 |
| JP | 2008123714 A | 5/2008 |
| JP | 2008159419 A | 7/2008 |
| JP | 2008288144 A | 11/2008 |
| JP | 2009123465 A | 6/2009 |
| JP | 4328915 A | 9/2009 |
| JP | 2011049153 A | 3/2011 |
| JP | 2011071098 A | 4/2011 |
| JP | 2011082033 A | 4/2011 |
| JP | 2012-033279 A | 2/2012 |
| JP | 2012094491 A1 | 5/2012 |
| JP | 5201364 B2 | 6/2013 |
| JP | 5321063 B2 | 6/2013 |
| JP | 5235437 B2 | 7/2013 |
| JP | 2015005443 A | 1/2015 |
| KR | 100908570 A | 8/2005 |
| KR | 20130134237 A | 12/2013 |
| KR | 20140083170 A | 7/2014 |
| KR | 20140106355 A | 9/2014 |
| KR | 20150106557 A | 9/2015 |
| KR | 101561646 A | 10/2015 |
| WO | 9744842 A1 | 11/1997 |
| WO | 2008079670 A1 | 7/2008 |
| WO | 2008153309 A1 | 12/2008 |
| WO | 2009022848 A1 | 2/2009 |
| WO | 2009035222 A1 | 3/2009 |
| WO | 2009038358 A1 | 3/2009 |
| WO | 2009040367 A1 | 4/2009 |
| WO | 2009084928 A1 | 7/2009 |
| WO | 2011051275 A1 | 5/2011 |
| WO | 2011099580 A1 | 8/2011 |
| WO | 2012046514 A1 | 4/2012 |
| WO | 2012132059 A1 | 10/2012 |
| WO | 2012132060 A1 | 10/2012 |
| WO | 2012132976 A1 | 10/2012 |
| WO | 2012005945 A1 | 12/2012 |
| WO | 2012170240 A1 | 12/2012 |
| WO | 2012176873 A1 | 12/2012 |
| WO | 2013010985 A1 | 1/2013 |
| WO | 2013033579 A1 | 3/2013 |
| WO | 2013033595 A1 | 3/2013 |
| WO | 2013137351 A1 | 9/2013 |
| WO | 2013180782 A1 | 12/2013 |
| WO | 2013180783 A1 | 12/2013 |
| WO | 2013184881 A1 | 12/2013 |
| WO | 2014080871 A1 | 5/2014 |
| WO | 2014165748 A1 | 10/2014 |
| WO | 2015046174 A1 | 4/2015 |
| WO | 2015051131 A1 | 4/2015 |
| WO | 2015051141 A1 | 4/2015 |
| WO | 2015121731 A1 | 8/2015 |
| WO | 2015179205 A1 | 11/2015 |
| WO | 2015179210 A1 | 11/2015 |
| WO | 2016025589 A1 | 2/2016 |
| WO | 2016044088 A1 | 3/2016 |

OTHER PUBLICATIONS

Henne, A.L, "A New Fluorination Method", J Am. Chem. Soc., 60(7), 1938, 1569-1571.

Hine, J. et al., "Methylenes as Intermediates in Polar Reactions. XXI. A Sulfur-containing Methylene", J. Amer. Chem. Soc. 82, 6118, 1960.

Jeong, S.-K., et al, "Surface Film Formation on a Graphite Negative Electrode in Lithium-Ion Batteries: Atomic Force Microscopy Study on the Effects of Film-Forming Additives in Propylene Carbonate Solutions", Langmuir, 2001, 17, 8281-8286.

Jung, H.M., et al., "Fluoropropane Sultone as an SEI-forming Additive that Outperforms Vinylene Carbonate", J. Mater. Chem. A, 2013, 1, 11975.

Kudryavtsev, I.Y., et al, "Catalytic Phosphorylation of Polyfluoroalkanols", Izvestiya Akademii Nausk SSSR, Seriya Khimicheskaya, 1982, 11, 2535-2540. Translation.

Lee, H. et al., :SEI Layer-Forming Additives for LiNiO.5Mn1.5O4/Graphite 5V Li-iion Batteries, Electrochem. Comm. 9 (2007) 801-806.

Liu, J. et al., "Understanding the Improved Electrochemical Performances of Fe-Substituted 5 V Spinel cathode LiMn1.5NiO.5O4", J. Phys. Chem. C, 2009, 113, 15073-15079.

McMillan, R. et al., "Fluoroethylene Carbonate Electrolyte and Its Use in Lithium Ion Batteries with Graphite Anodes", J Power Sources 81-82 (1999) 20-26.

Mogi, Ryo et al, "Effects of Some Organic Additives on Lithium Deposition in Propylene Carbonate", J. Electrochem. Soc., 2002, 149(12), A1578-A1583.

Nagasubramanian, G. "Fluoro-Carbonate Solvents for Li-Ion Cells", Proc. Electrochem. Soc., 2000, 99(25), 434-439.

Nakajima, T. et al., "Effect of Fluoroesters on the Low Temperature Electrochemical Characteristics of Graphite Electrode", J Fluorine Chem 87 (1998) 221-227.

Rajeshwaran, G. G., et al, "Lewis Acid-Mediated Michaelis-Arbuzov Reaction at Room Temperature: A Facile Preparation of Arylmethyl/Heteroarylmethyl Phosphonates", Org. Lett., 2011, 13, 1270-1273.

Sasaki, Y. et al, "Physical and Electrolytic Properties of Partially Fluorinated Organic Solvents and Its Application to Secondary Lithium Batteries: Partially Fluorinated Dialkoxyethanes", ECS Transactions, 16, (35), 2009, 23-31.

Schmitz, R.W. et al, "Investigations on Novel Electrolytes, Solvents and SEI Additives for Use in Lithium-ion Batteries: Systematic Electrochemical Characterization and Detailed Analysis by Spectroscopic Methods", Progress Solid State Chem., 42 (2014) 65-84.

Sekiya, A. et al, "The Potential of Hydrofluoroethers to Replace CFCs, HCFCs, and PFCs", J Fluorine Chem, 101(2000) 215-221.

Smart, M. C. et al, "Li-Ion Electrolytes Containing Ester Co-Solvents for Wide Operating Temperature Range", ECS Transactions, 11(29), 2008, 99-108.

Smith, K. A. et al., "Electrolytes Containing Fluorinated Ester Co-Solvents for Low-Temperature Li-Ion Cells", ECS Transactions, 11(29), 2008, 99-108.

SynQuest Laboratories, Inc. Research Chemicals Catalog, 2003, pp. 128-129.

Tarrant, P. et al, "Some Reactions of Fluoroethanes with Sodium Ethoxide", J. Am. Chem. Soc., 75, (1953), 932-934.

Wachtler, M. et al., "The Behaviour of Graphite, Carbon Black, and Li4Ti5O12 in LiBOB-Based Electrolytes", J. Applied Electrochemistry (2006) 36: 1199-1206.

(56) References Cited

OTHER PUBLICATIONS

Xu et al, "Sulfone-Based Electrolytes for Lithium-Ion Batteries", Journal of the electrochemical Society, 2002, A920-A926, 149 (7).
Xu, K. "Nonaqueous Liquid Electrolytes for Lithium-Based Rechargeable Batteries", Chem. Rev., 2004, 104, 4303-4418.
Yamaki, J.-I. et al, "Thermal Studies of Fluorinated Ester as a Novel Candidate for Electrolyte Solvent of Lithium Metal Anode Rechargeable Cells", J Power Sources, 102 (2001) 288-293.
Yang, L. et al., "Effect of Impurities and Moisture on Lithium Bisoxalatoborate (LiBOB) Electrolyte Performance in Lithium-Ion Cells", J. Power Sources 195 (2010) 1698-1705.
Yoon, S. et al, "Sb-Mox-C (M=Al, Ti, or Mo) Nanocomposite Anodes for Lithium-Ion Batteries", Chem. Mater. 2009, 21, 3898-3904.
Zaharov et al., "A New Method of Phosphorylation of Polyfluorinated Aliphatic Alcohols", Izvestiya Akademii Nausk USSR, Seriya Khimicheskaya, No. 8, p. 1860, 1969, Translation.
Zhang, S.S., "A Review on Electrolyte Additives for Lithium-Ion Batteries", J Power Sources, 162 (2006) 1379-1394.
Zhong, G. B. et al, "Effects of Al Substitution for Ni and Mn on the Electrochemical Properties of LiNiO.5Mn1.504", Electrochimica Acta, 56 (18), 2011, 6554-6561.
International Search Report and Written Opinion, Related PCT International Application PCT/US2012/053439 dated Jan. 22, 2013.
International Search Report and Written Opinion, Related PCT International Application PCT/US2013/029818 dated May 14, 2013.
International Search Reportand Written Opinion, Related PCT International Application PCT/US2013/029825 dated May 14, 2013.
International Search Report and Written Opinion, Related PCT International Application PCT/US2012/053415 dated Jan. 22, 2013.
International Search Report and Written Opinion, Related PCT International Application PCT/US2014/058845 dated Dec. 11, 2014.
International Search Report and Written Opinion, Related PCT International Application PCT/US2014/058859 dated Feb. 25, 2015.
International Search Report and Written Opinion, Related PCT International Application PCT/US2014/032961 dated Jul. 15, 2014.
International Search Report and Written Opinion, Related PCT International Application PCT/US2015/030785 dated Jul. 16, 2015.
International Search Report and Written Opinion, Related PCT International Application PCT/US2015/030807 dated Jul. 17, 2015.
International Search Report and Written Opinion, Related PCT International Application PCT/US2015/044844 dated Dec. 22, 2015.
International Search Report and Written Opinion, Related PCT International Application PCT/US2015/049642 dated Dec. 22, 2015.
2nd Notification of Reasons for Refusal (Office Action) issued by the Japan Patent Office dated Jul. 25, 2017, in related Japanese Patent Application No. JP 2015-514985, with English translation (6 pages).

* cited by examiner

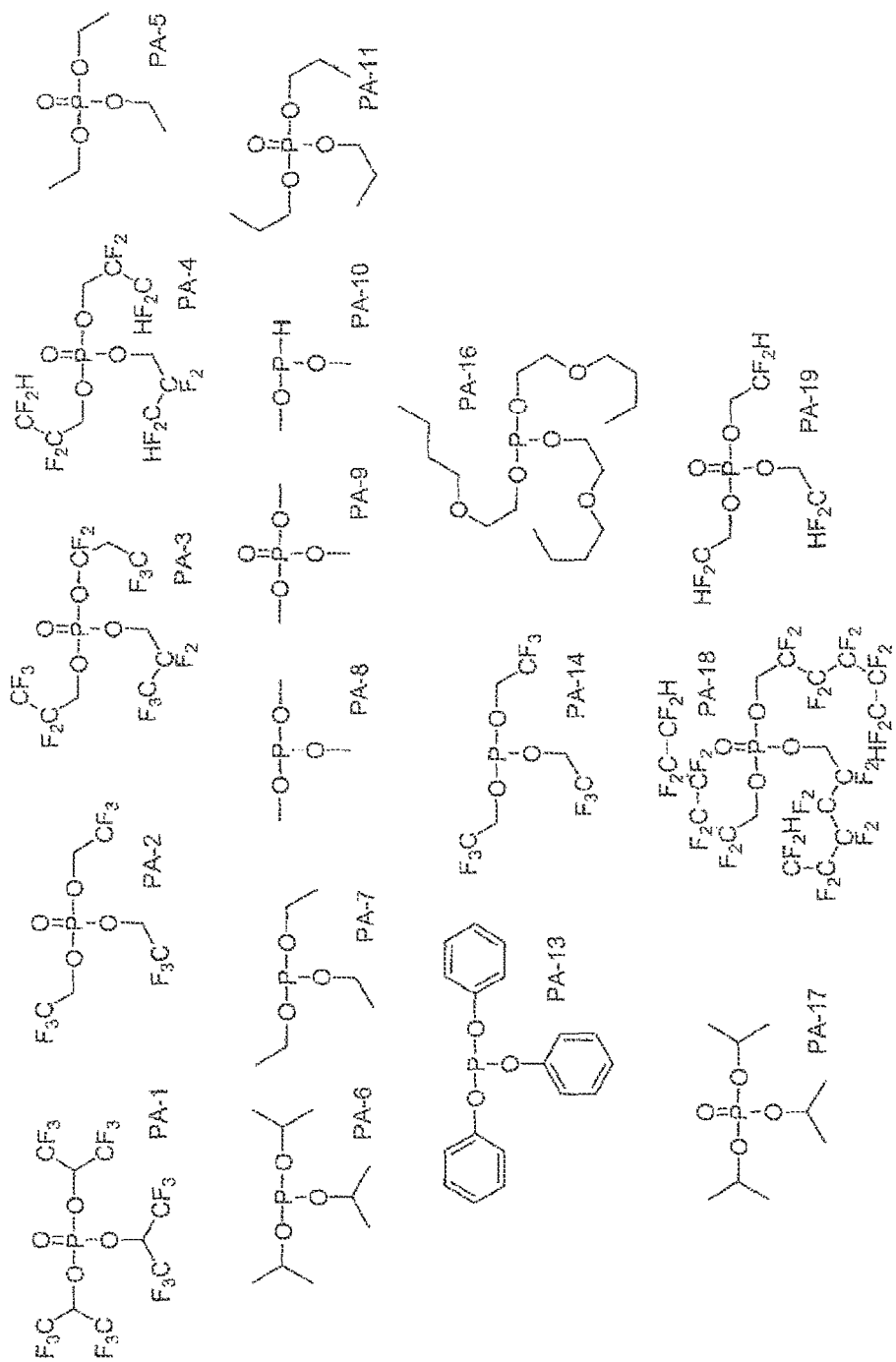

ADDITIVES TO IMPROVE ELECTROLYTE PERFORMANCE IN LITHIUM ION BATTERIES

This application claims priority under 35 U.S.C. § 119(e) from, and claims the benefit of, U.S. Provisional Application No. 61/654,184 filed Jun. 1, 2012, which is by this reference incorporated in its entirety as a part hereof for all purposes.

TECHNICAL FIELD

This invention relates to the field of lithium ion batteries. More specifically, the invention relates to a lithium ion battery comprising a 5 V stabilized manganese cathode and a nonaqueous electrolyte comprising a phosphate additive.

BACKGROUND

Lithium ion batteries are being intensively pursued for hybrid electric vehicle (HEV) and plug-in hybrid electric vehicle (PHEV) applications. Both the 4 V spinel $LiMn_2O_4$ and 3.4 V olivine $LiFePO_4$ cathodes have drawn much attention in this regard because Mn and Fe are inexpensive and environmentally benign. Additionally, these cathodes provide a higher rate capability and better safety compared to layered oxide cathodes. However, both $LiMn_2O_4$ and $LiFePO_4$ cathodes have limited energy density due to their low capacity or operating voltage.

One way to improve the energy and power density is to increase the operating voltage. In this regard, the 5 V spinel cathode $LiMn_{1.5}Ni_{0.5}O_4$ has drawn much attention due to a nearly flat operating voltage close to 5 V and an acceptable capacity arising from operation of the $Ni^{2+/3+}$ and $Ni^{3+/4+}$ redox couples.

The $LiMn_{1.5}Ni_{0.5}O_4$ cathode, however, can be characterized by suboptimal cycling performance in a conventional carbonate electrolyte, and this may be due to the large lattice strain during cycling, which involves the formation of three cubic phases with a large lattice parameter difference during the charge-discharge process. Other contributors to suboptimal cycling performance include the $Li_xNi_{1-x}O$ impurity, and the corrosion reaction between the cathode surface and the carbonate electrolyte at the high operating voltage of approximately 5 V.

Partial substitution of Mn and Ni in $LiMn_{1.5}Ni_{0.5}O_4$ by other elements such as Li, Al, Mg, Ti, Cr, Fe, Co, Cu, Zn, and Mo has been pursued to improve the cyclability, as discussed in U.S. Pat. No. 6,337,158 (Nakajima); and in Liu et al, *J. Phys. Chem. C* 13:15073-15079, 2009. Although improvement in cycling performance can be achieved in a conventional carbonate electrolyte at room temperature by partial cation substitution, high-temperature cycling performance still remains a problem due to the intrinsic instability of the traditional carbonate electrolyte and the accelerated decomposition reaction at elevated temperature.

U.S. Patent Application Publication No. 2012/0009485 A1 (Xu et al.) describes a series of compounds that can be used as co-solvents, solutes, or additives in non-aqueous electrolytes for use with 5 V class cathodes in lithium ion batteries. However, the use of these compounds with stabilized manganese cathodes in lithium ion batteries was not described.

Despite the efforts in the art as described above, a need remains for a lithium ion battery containing a stabilized manganese cathode that operates at high voltage (i.e. up to about 5 V) and has improved cycling performance at high temperature.

SUMMARY

In one embodiment, there is provided herein a lithium ion battery comprising:
a) a stabilized manganese cathode;
b) an anode;
c) a porous separator between said anode and said cathode;
d) a nonaqueous electrolyte composition providing an ionically conductive pathway between said anode and said cathode, wherein said electrolyte comprises:
(i) a solvent mixture comprising:
(A) ethylene carbonate;
(B) at least one co-solvent; and
(C) at least one phosphate additive represented by the formula:

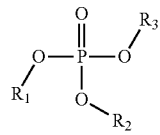

wherein $R_1$, $R_2$, and $R_3$ are each independently normal or branched C1 to C10 alkyl or fluoroalkyl, 03 to C10 cyclic alkyl, C2 to C10 ether, C2 to C10 ether wherein at least one of the hydrogens is replaced with a fluorine, $R_1$ and $R_2$, $R_2$ and $R_3$, or $R_1$ and $R_3$ may be joined to form a ring; and
(ii) at least one electrolyte salt.

In an alternative embodiment, ethylene carbonate can be present in the solvent mixture in an amount of about 10% to about 40% by weight; a co-solvent can be present in an amount of about 20% to about 80% by weight; and a phosphate additive can be present in an amount of about 0.2% to about 10% by weight.

BRIEF DESCRIPTION OF THE FIGURE

FIG. 1 shows the structures of the phosphorus-containing additives described herein.

DETAILED DESCRIPTION

Disclosed herein is a lithium ion battery, which is a type of rechargeable battery in which lithium ions move from the anode to the cathode during discharge, and from the cathode to the anode during charge. The lithium ion battery disclosed herein includes a housing; an anode and a stabilized manganese cathode disposed in the housing and in ionically conductive contact with one another; a nonaqueous electrolyte composition comprising at least one phosphate additive, providing an ionically conductive pathway between the anode and the cathode; and a porous separator between the anode and the cathode. The lithium ion battery disclosed herein operates with the cathode at a high voltage (i.e. up to about 5 V relative to a Li|Li$^+$ reference electrode), and this type of battery can thus in some instances be referred to as a "high voltage" lithium ion battery. It has improved cycling performance at high temperature compared to other, conventional lithium ion batteries.

The lithium ion battery hereof includes a cathode, which is the electrode of an electrochemical cell at which reduction occurs during discharge. In a galvanic cell, such as a battery, the cathode is the more positively charged electrode. The cathode in the lithium ion battery hereof is a stabilized manganese cathode comprising a lithium-containing manganese composite oxide having a spinel structure as cathode active material. The lithium-containing manganese composite oxide in a cathode as used herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18, and d is 0 to 0.3. In one embodiment, in the above formula, y is 0.38 to 0.48, z is 0.03 to 0.12, and d is 0 to 0.1. In one embodiment, in the above formal, M is one or more of Li, Cr, Fe, Co, and Ga. Stabilized manganese cathodes may also comprise spinel-layered composites which contain a manganese-containing spinel component and a lithium rich layered structure, as described in U.S. Pat. No. 7,303,840.

The cathode active material can be prepared using methods such as the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of $LiOH.H_2O$ at about 800 to about 950° C. in oxygen for 3 to 24 hours, as described in detail in the examples herein. Alternatively, the cathode active material can be prepared using a solid phase reaction process or a sol-gel process as described in U.S. Pat. No. 5,738,957 (Amine).

The cathode, in which the cathode active material is contained, may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

The lithium ion battery hereof further contains an anode, which is the electrode of an electrochemical cell at which oxidation occurs during discharge. In a galvanic cell, such as a battery, the anode is the negatively charged electrode. The anode contains anode active material, which can be any material capable of storing and releasing lithium ions. Examples of suitable anode active materials include without limitation lithium alloys such as lithium-aluminum alloy, lithium-lead alloy, lithium-silicon alloy, lithium-tin alloy and the like; carbon materials such as graphite and mesocarbon microbeads (MCMB); phosphorus-containing materials such as black phosphorus, $MnP_4$ and $CoP_3$; metal oxides such as $SnO_2$, $SnO$ and $TiO_2$; and lithium titanates such as $Li_4Ti_5O_{12}$ and $LiTi_2O_4$. In one embodiment, the anode active material is lithium titanate or graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as NEI Inc. (Somerset, N.J.), and Farasis Energy Inc. (Hayward, Calif.).

The lithium ion battery hereof further contains a nonaqueous electrolyte composition, which is a chemical composition suitable for use as an electrolyte in a lithium ion battery. The nonaqueous electrolyte composition comprises a solvent mixture comprising ethylene carbonate at a concentration of about 10% to about 40% by weight, at least one co-solvent at a concentration of about 20% to about 80% by weight, and at least one phosphate additive at a concentration of about 0.2% to about 10% by weight. The nonaqueous electrolyte composition also contains at least one electrolyte salt. For best results, it is desirable that the ethylene carbonate used is battery grade or has a purity level of at least about 99.9%, and more particularly at least about 99.99%. The electrolyte salt is an ionic salt that is at least partially soluble in the solvent of the nonaqueous electrolyte composition and that at least partially dissociates into ions in the solvent of the nonaqueous electrolyte composition to form a conductive electrolyte composition. The conductive electrolyte composition puts the cathode and anode in ionically conductive contact with one another such that ions, in particular lithium ions, are free to move between the anode and the cathode and thereby conduct charge through the electrolyte composition between the anode and the cathode.

Ethylene carbonate and the co-solvent may be combined in various ratios to form the solvent mixture as used in the electrolyte composition, depending on the desired properties of the electrolyte composition. In one embodiment, ethylene carbonate comprises about 10% to about 40% by weight of the solvent mixture and the co-solvent comprises about 20% to about 80% by weight of the solvent mixture. In another embodiment, ethylene carbonate comprises about 15% to about 40% by weight of the solvent mixture and the co-solvent comprises about 40% to about 80% by weight of the solvent mixture. In another embodiment, ethylene carbonate comprises about 25% to about 30% by weight of the solvent mixture and the co-solvent comprises about 65% to about 70% by weight of the solvent mixture. In one embodiment, the phosphate additive comprises about 0.2% to about 10% by weight of the solvent mixture. In another embodiment, the phosphate additive comprises about 0.5% to about 5% by weight of the solvent mixture. In another embodiment, the phosphate additive comprises about 0.5% to about 2% by weight of the solvent mixture. In another embodiment, the phosphate additive comprises about 0.5% to about 1.5% by weight of the solvent mixture. In another embodiment, the phosphate additive comprises about 1% by weight of the solvent mixture.

In some embodiments, the co-solvent is a fluorine-containing carboxylic acid ester represented by the formula: $R_4$—COO—$R_5$, where $R_4$ and $R_5$ independently represent an alkyl group, the sum of carbon atoms in $R_4$ and $R_5$ is 2 to 7, at least two hydrogens in $R_4$ and/or $R_5$ are replaced by fluorines and neither $R_4$ nor $R_5$ contains a $FCH_2$ or FCH group. The presence of a monofluoroalkyl group (i.e., $FCH_2$ or FCH) in the carboxylic acid ester is believed to cause toxicity. Suitable co-solvents include without limitation, $CH_3$—COO—$CH_2CF_2H$ (2,2-difluoroethyl acetate), $CH_3CH_2$—COO—$CH_2CF_2H$ (2,2-difluoroethyl propionate), $F_2CHCH_2$—COO—$CH_3$ (methyl 3,3-difluoropropanoate), $F_2CHCH_2$—COO—$CH_2CH_3$ (ethyl 3,3-difluoropropanoate), $CH_3$—COO—$CH_2CH_2CF_2H$ (3,3-difluoropropyl acetate), $CH_3CH_2$—COO—$CH_2CH_2CF_2H$ (3,3-difluoropropyl propionate), and $F_2CHCH_2CH_2$—COO—$CH_2CH_3$ (ethyl 4,4-difluorobutanoate). In some embodiments, the co-solvent is $CH_3$—COO—$CH_2CF_2H$ (2,2-difluoroethyl acetate) or $CH_3CH_2$—COO—$CH_2CF_2H$ (2,2-difluoroethyl propionate). In one embodiment, the solvent mixture of the nonaqueous electrolyte composition comprises ethylene carbonate and CH₃—COO—CH₂CF₂H (2,2-difluoroethyl acetate) or CH₃CH₂—COO—CH₂CF₂H (2,2-difluoroethyl propionate) at a weight ratio of about 30:70 and contains a phosphate additive at about 1% by weight.

These fluorine-containing carboxylic acid esters may be prepared using methods known in the art. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate and 2,2-difluoroethyl propionate can be prepared using the method described in the Examples herein below. Other fluorine-containing carboxylic acid esters may be prepared using the same method using different starting carboxylate salts. For best results, it is desirable to purify the fluorine-containing carboxylic esters to a purity level of at least about 99.9%, more particularly at least about 99.99%. These fluorinated solvents may be purified using distillation methods such as vacuum distillation or spinning band distillation.

In some embodiments, the co-solvent is a non-fluorinated solvent. Examples of suitable non-fluorinated co-solvents include without limitation ethyl methyl carbonate, dimethyl carbonate, diethyl carbonate, and propylene carbonate. For best results, it is desirable to use a co-solvent that is battery grade or has a purity level of at least about 99.9%, and more particularly at least about 99.99%. These co-solvents may be purified using the methods listed above. In one embodiment, the solvent mixture comprises ethylene carbonate and ethyl methyl carbonate at a weight ratio of about 30:70.

The solvent mixture also contains a phosphate additive represented by the formula:

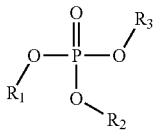

wherein $R_1$, $R_2$, and $R_3$ are each independently normal or branched C1 to C10 alkyl or fluoroalkyl, C3 to C10 cyclic alkyl, C2 to C10 ether, C2 to C10 ether wherein at least one of the hydrogens is replaced with a fluorine, $R_1$ and $R_2$, $R_2$ and $R_3$, or $R_1$ and $R_3$ may be joined to form a ring. The term "fluoroalkyl", as used herein, refers to an alkyl group wherein one or more hydrogens have been replaced with one or more fluorines. Suitable examples of phosphate additives include without limitation tris(1,1,1,3,3,3-hexafluoropropan-2yl) phosphate (also referred to herein as PA-1, CAS No. 66489-68-7), tris(2,2,2-trifluoroethyl) phosphate (also referred to herein as PA-2, CAS No. 358-63-4), tri(2,2,3,3,3-pentafluoropropyl) phosphate (also referred to herein as PA-3, CAS No. 25476-41-9), tris(2,2,3,3-tetrafluoropropyl) phosphate (also referred to herein as PA-4, CAS No. 563-10-0), triethyl phosphate (also referred to herein as PA-5, CAS No. 78-40-0), trimethyl phosphate (also referred to herein as PA-9, CAS No. 512-56-1), tripropyl phosphate (also referred to herein as PA-11, CAS No. 513-08-6), triisopropyl phosphate (also referred to herein as PA-17, CAS No. 513-02-0), tris(2,2,3,3,4,4,5,5,6,6-decafluorohexyl) phosphate (also referred to herein as PA-18), and tris(2,2-difluoroethyl) phosphate (also referred to herein as PA-19, CAS No. 358-64-5). The structures of these phosphate additives, as well as the phosphites used in the Comparative Examples described herein below, are shown in FIG. 1.

Some of the phosphate additives may be obtained from commercial sources such as Sigma-Aldrich (Milwaukee, Wis.). The phosphate additives may also be prepared using methods known in the art. For example, phosphate additives may be prepared by the method described by A. von Cresce et al. (Journal of the Electrochemical Society, No. 158, p. A337, 2011), using the reaction of phosphorus oxychloride with the corresponding fluorinated alcohol in the presence of lithium hydride in diethyl ether. Phosphate additives may also be prepared using the procedure described by L. Zaharov et al., (Izvestiya Akademii Nausk USSR, Seriya Khimicheskaya, No. 8, p. 1860, 1969) and I. Kudryvtsev et al. (Izvestiya Akademii Nausk USSR, Seriya Khimicheskaya, No. 11, pp. 2535-2540, 1982), using the reaction of phosphorus oxychloride with the corresponding fluorinated alcohol in the presence of LiCl catalyst in the absence of a solvent. The phosphate additives may be purified using methods known in the art, as described above.

The nonaqueous electrolyte composition in a lithium ion battery herein also contains at least one electrolyte salt. Suitable electrolyte salts include without limitation:
lithium hexafluorophosphate (LiPF₆),
lithium tris(pentafluoroethyl)trifluorophosphate (LiPF₃(CF₂CF₃)₃),
lithium bis(trifluoromethanesulfonyl)imide,
lithium bis(perfluoroethanesulfonyl)imide,
lithium (fluorosulfonyl) (nonafluorobutanesulfonyl)imide,
lithium bis(fluorosulfonyl)imide,
lithium tetrafluoroborate,
lithium perchlorate,
lithium hexafluoroarsenate,
lithium trifluoromethanesulfonate,
lithium tris(trifluoromethanesulfonyl)methide,
lithium bis(oxalato)borate,
lithium difluoro(oxalato)borate,
$Li_2B_{12}F_{12-x}H_x$ where x is equal to 0 to 8, and
mixtures of lithium fluoride and anion receptors such as $B(OC_6F_5)_3$.

Mixtures of two or more of these or comparable electrolyte salts may also be used. In one embodiment, the electrolyte salt is lithium hexafluorophosphate. The electrolyte salt can be present in the electrolyte composition in an amount of about 0.2 to about 2.0 M, more particularly about 0.3 to about 1.5 M, and more particularly about 0.5 to about 1.2 M.

The nonaqueous electrolyte composition in a lithium ion battery hereof may also contain at least one film-forming additive in the solvent mixture. Suitable film-forming additives include without limitation
4-fluoroethylene carbonate (also referred to herein as 4-fluoro-1,3 dioxolan-2-one, CAS No. 114435-02-8) and its derivatives,
ethylene sulfate and its derivatives,
vinyl ethylene carbonate and its derivatives,
vinylene carbonate and its derivatives,
maleic anhydride and its derivatives, and
vinyl acetate.

In one embodiment, the film-forming additive is 4-fluoroethylene carbonate. These additives are generally available commercially; fluoroethylene carbonate, for example, is available from companies such as China LangChem INC. (Shanghai, China) and MTI Corp. (Richmond, Calif.). It is desirable to purify these film-forming additives to a purity level of at least about 99.0%, more particularly at least about 99.9%. Purification may be done using known methods, as described above. The film-forming additive, if used, is generally present in an amount of about 0.01% to about 5%, more particularly about 0.1% to about 2%, and more particularly about 0.5% to about 2% by weight of the total electrolyte composition. In one embodiment, the film-forming additive is 4-fluoroethylene carbonate at a concentration of about 0.5% to about 2% by weight of the total electrolyte composition.

The lithium ion battery hereof also contains a porous separator between the anode and cathode. The porous separator serves to prevent short circuiting between the anode and the cathode. The porous separator typically consists of a single-ply or multi-ply sheet of a microporous polymer such as polyethylene, polypropylene, polyamide or polyimide, or a combination thereof. The pore size of the porous separator is sufficiently large to permit transport of ions to provide ionically conductive contact between the anode and cathode, but small enough to prevent contact of the anode and cathode either directly or from particle penetration or dendrites which can from on the anode and cathode. Examples of porous separators suitable for use herein are disclosed in U.S. application Ser. No. 12/963,927 (filed 9 Dec. 2010, U.S. Patent Application Publication No. 2012/0149852), which is by this reference incorporated in its entirety as a part hereof for all purposes.

The housing of the lithium ion battery hereof may be any suitable container to house the lithium ion battery components described above. Such a container may be fabricated in the shape of small or large cylinder, a prismatic case or a pouch.

A lithium ion battery hereof may be used for grid storage or as a power source in various electronically powered or assisted devices (an "Electronic Device") such as a transportation device (including a motor vehicle, automobile, truck, bus or airplane), a computer, a telecommunications device, a camera, a radio, or a power tool.

EXAMPLES

The subject matter disclosed herein is further defined in the following examples. It should be understood that these examples, while describing various features of certain particular embodiments of some of the inventions hereof, are given by way of illustration only.

The meaning of abbreviations used is as follows: "g" means gram(s), "mg" means milligram(s), "μg" means microgram(s), "L" means liter(s), "mL" means milliliter(s), "mol" means mole(s), "mmol" means millimole(s), "M" means molar concentration, "wt %" means percent by weight, "mm" means millimeter(s), "ppm" means parts per million, "h" means hour(s), "min" means minute(s), "Hz" means hertz, "mS" means millisiemens(s), "mA" mean milliamp(s), "mAh/g" mean milliamp hour(s) per gram, "V" means volt(s), "xC" refers to a constant current that can fully charge/discharge the cathode in 1/x hours, "SOC" means state of charge, "SEI" means solid electrolyte interface formed on the surface of the electrode material, "Pa" means pascal(s), "kPa" means kilopascal(s), "rpm" means revolutions per minute, "psi" means pounds per square inch, "NMR" means nuclear magnetic resonance spectroscopy, "GC/MS" means gas chromatography/mass spectrometry.

Materials and Methods:

The following additives were obtained from Sigma-Aldrich (Milwaukee, Wis.): triethyl phosphate (PA-5), triisopropyl phosphite (PA-6), triethyl phosphite (PA-7), trimethyl phosphite (PA-8), trimethyl phosphate (PA-9), dimethyl phosphonite (PA-10), tripropyl phosphate (PA-11), triphenyl phosphate (PA-12), triphenyl phosphite (PA-13), tris(2,2,2-trifluoroethyl) phosphite (PA-14), allyl diethyl phosphite (PA-15), tris(2-butoxyethyl) phosphite (PA-16), and triisopropyl phosphate (PA-17).

The following additives were prepared using the procedure described by A. von Cresce et al. (*Journal of the Electrochemical Society*, No. 158, p. A337, 2011) using the reaction of phosphorus oxychloride with the corresponding fluorinated alcohol in the presence of lithium hydride in diethyl ether: tris(1,1,1,3,3,3-hexafluoropropan-2-yl) phosphate (PA-1), tris(2,2,2-trifluoroethyl phosphate (PA-2), and tris(2,2,3,3,3-pentafluoropropyl) phosphate (PA-3).

The following additives were prepared using the procedure described by L. Zaharov et al., (*Izvestiya Akademii Nausk USSR, Seriya Khimicheskaya*, No. 8, p. 1860, 1969) and I. Kudryvtsev et al. (*Izvestiya Akademii Nausk USSR, Seriya Khimicheskaya*, No. 11, pp. 2535-2540, 1982), using the reaction of phosphorus oxychloride in the presence of LiCl catalyst in the absence of a solvent: tris(2,2,3,3-tetrafluoropropyl) phosphate (PA-4), tris(2,2,3,3,4,4,5,5,6,6-decafluorohexyl) phosphate (PA-18), and tris(2,2-difluoroethyl) phosphate (PA-19).

Preparation of 2,2-Difluoroethyl Acetate

Potassium acetate (Aldrich, 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3-neck round bottom flask containing a heavy magnetic stir bar. The flask was sealed with stoppers, transferred into a fume hood, and equipped with a thermocouple well, a dry-ice condenser, and an addition funnel under a flow of dry nitrogen.

Sulfolane (500 mL, Aldrich, 99%, 600 ppm of water as determined by Karl Fischer titration) was melted and added to the 3-neck round bottom flask as a liquid under a flow of nitrogen. Agitation was started and the temperature of the reaction mixture was brought to about 100° C. 2-Bromo-1,1-difluoroethane ($HCF_2CH_2Br$, 290 g, 2 mol, E.I. du Pont de Nemours and Co., 99%) was placed in the addition funnel and was slowly added to the reaction mixture. The addition was mildly exothermic and the temperature of the reaction mixture rose to 120-130° C. in 15-20 min after the start of the addition. The addition of $HCF_2CH_2Br$ was kept at a rate which maintained the internal temperature at 125-135° C. The addition took about 2-3 h. The reaction mixture was agitated at 120-130° C. for an additional 6 h (typically the conversion of bromide at this point was about 90-95%). Then, the reaction mixture was cooled down to ambient temperature and was agitated overnight. Next morning, heating at 130° C. was resumed for another 8 h.

At this point the starting bromide was not detectable by NMR and the crude reaction mixture contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent19091S-433, 30.m, 250 µm, 0.25 µm; carrier gas—He, flow rate 1 mL/min; temperature program: 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3A molecular sieves, until water was not detectable by Karl Fischer titration (i.e., <1 ppm).

Preparation of 2,2-Difluoroethyl Propionate

Potassium propionate (Aldrich, 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 75 g (0.67 mol, 10 mol % excess) of the dried potassium propionate was placed into a 500 mL, 3-neck round bottom flask containing a heavy magnetic stir bar. The flask was sealed with stoppers, transferred into a fume hood, and equipped with a thermocouple well, a dry-ice condenser, and an addition funnel under a flow of dry nitrogen.

Sulfolane (300 mL, Aldrich 99%, 600 ppm of water as determined by Karl Fischer titration) was melted and added to the 3-neck round bottom flask as a liquid under a flow of nitrogen. Agitation was started and the temperature of the reaction mixture was brought to about 100° C. $HCF_2CH_2Br$ (87 g, 0.6 mol, E.I. du Pont de Nemours and Co., 99%) was placed in the addition funnel and was slowly added to the reaction mixture. The addition was mildly exothermic and the temperature rose to 120-130° C. in 15-20 min after the start of the addition. The addition of $HCF_2CH_2Br$ was kept at a rate which maintained the internal temperature at 125-135° C. The addition took about 2-3 h. The reaction mixture was agitated at 120-130° C. for an additional 6 h (typically the conversion of bromide at this point was about 90-95%). Then, the reaction mixture was cooled down to ambient temperature and was agitated overnight. Next morning, heating at 130° C. was resumed for another 8 h.

At this point, the starting bromide and 1,1-difluoroethanol were not detectable in the crude reaction mixture by NMR. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 3 h and resulted in 48 g of crude $HCF_2CH_2OC(O)C_2H_5$ of about 98% purity. Further purification of the crude product was carried out using spinning band distillation at atmospheric pressure. The fraction having a boiling point between 120.3-120.6° C. was collected and the impurity profile was monitored using GC/MS (capillary column HP5MS, phenyl-methyl siloxane, Agilent 19091S-433, 30 m, 250 µm, 0.25 µm; carrier gas—He, flow rate 1 mL/min; temperature program: 40° C., 4 min, temp. ramp 30° C./min, 230° C., 20 min). The crude product (43 g) had a purity of 99.91% and contained about 300 ppm of water. Water was removed from the product by treatment with 3A molecular sieves, until water was not detectable by Karl Fischer titration (i.e., <1 ppm).

$HCF_2CH_2OC(O)C_2H_5$: $^1H$ NMR ($CDCl_3$): 1.10 (3H. t), 2.35 (2H, q), 4.21 (2H, td), 5.87 (1H, tt) ppm; $^{19}F$ NMR ($CDCl_3$): −125.68 (dt, 56.6, 13.7 Hz) ppm. GS/MS (m/z): 138 ($M^+$, $C_5H_8F_2O_2^+$).

Preparation of $LiMn_{1.5}Ni_{0.42}Fe_{0.08}O_4$ Cathode Active Material

For the preparation of $LiMn_{1.5}Ni_{0.42}Fe_{0.08}O_4$, 401 g manganese (II) acetate tetrahydrate (Aldrich 63537), 115 g nickel (II) acetate tetrahydrate (Aldrich 72225) and 15.2 g iron (II) acetate anhydrous (Alfa Aesar 31140) were weighed into bottles on a balance then dissolved in 5 L of deionized water. KOH pellets were dissolved in 10 L of deionized water to produce a 3.0 M solution inside a 30 L reactor. The acetate solution was transferred to an addition funnel and dripped into the rapidly stirred reactor to precipitate the mixed hydroxide material. Once all 5 L of the acetate solution was added to the reactor stirring was continued for 1 h. Then stirring was stopped and the precipitate was allowed to settle overnight. After settling the liquid was removed from the reactor and 15 L of fresh deionized water was added. The contents of the reactor were stirred, allowed to settle again, and liquid removed. This rinse process was repeated. Then the precipitate was transferred to two (split evenly) coarse glass frit filtration funnels covered with Dacron® paper. The solids were rinsed with deionized water until the filtrate pH reached 6 (pH of deionized rinse water), and a further 20 L of deionized water was added to each filter cake. Finally the cakes were dried in a vacuum oven at 120° C. overnight. The yield at this point was typically 80-90%.

The hydroxide precipitate was next ground and mixed with lithium carbonate. This step was done in 60 g batches using a Fritsche Pulverisette automated mortar and pestle. For each batch the hydroxide mixture was weighed, then ground alone for 5 minutes in the Pulveresette. Then a stoichiometric amount with small excess of lithium carbonate was added to the system. For 53 g of hydroxide 11.2 g of lithium carbonate was added. Grinding was continued for a total of 60 minutes with stops every 10-15 minutes to scrape the material off of the surfaces of the mortar and pestle with a sharp metal spatula. If humidity caused the material to form clumps, it was sieved through a 40 mesh screen once during grinding, then again following grinding.

The ground material was fired in air in a box furnace inside shallow rectangular alumina trays. The trays were 158 mm by 69 mm in size, and each held about 60 g of material. The firing procedure consisted of ramping from room temperature to 900° C. in 15 hours, holding at 900° C. for 12 hours, then cooling to room temperature in 15 hours.

Preparation of Nonaqueous Electrolyte Composition Comprising 2,2-Difluoroethyl Acetate (DFEA) and Ethylene Carbonate (EC)

2,2-Difluoroethyl acetate, prepared as described above, was purified by spinning band distillation twice to 99.992% purity, as determined by gas chromatography using a mass spectrometric detector. The purified 2,2-difluoroethyl acetate and ethylene carbonate (anhydrous, Novolyte, Independence, Ohio) were mixed together to make 15 mL of total solution in a 70:30 w/w ratio, and the resulting mixture was dried over 3A molecular sieves (Sigma-Aldrich, Milwaukee, Wis.). After drying, the water content was determined to be <0.5 ppm using Karl Fischer titration. The solution was syringe filtered through a 0.2 µm PTFE syringe filter. To 15.0 mL of the resulting solution was added 2.28 g of lithium hexafluorophosphate (battery grade, Novolyte) and the mixture was shaken for a few minutes until all the solid was dissolved.

Preparation of Nonaqueous Electrolyte Composition Comprising 2,2-Difluoroethyl Acetate (DFEA), Ethylene Carbonate (EC) and Additive The desired additive was distilled from calcium chloride to remove residual water. The purified additive was added to the DFEA/EC nonaqueous electrolyte composition described above to give a loading of 1% by volume and the mixture was shaken for several minutes to mix the electrolyte and the additive.

Preparation of Nonaqueous Electrolyte Composition Comprising Ethyl Methyl Carbonate (EMC)/Ethylene Carbonate (EC) and Additive The purified additive was added to a nonaqueous electrolyte solution containing EMC/EC and $LiPF_6$, obtained from Novolyte (Independence, Ohio), at 1% loading by volume. The solution was shaken for several minutes to mix the electrolyte and additive.

Preparation of an Iron-Doped, Lithium, Nickel, Manganese Oxide (Fe-LNMO) Cathode The following is a description of a representative preparation of an Fe-LNMO cathode. The cathode active material $LiMn_{1.6}Ni_{0.42}Fe_{0.08}O_4$, prepared as describe above, was ground for ten minutes using an agate mortar and pestle and then passed through a 75 μm sieve. Particle size was measured to be 18 μm (d90, i.e., 90% of the mass had a diameter of 18 μm or less). The sized cathode active material (1.240 g), 0.155 g of Denka black (acetylene black, DENKA Corp., Japan), 1.292 g of polyvinylidene difluoride (PVDF) solution (12 wt % in N-methylpyrrolidone (NMP), Kureha America Inc., New York, N.Y., KFL#1120), and an additional 2.313 g of anhydrous NMP (Sigma-Aldrich, Milwaukee, Wis.) were mixed first using a planetary centrifugal mixer (THINKY ARE-310, THINKY Corp., Japan) at 2,000 rpm, a shear mixer (VWR, Wilmington, N.C.), and then a planetary centrifugal mixer at 2,000 rpm to form a uniform slurry. The slurry was coated on 25 μm thick aluminum foil using a doctor blade, dried on a hot plate at 100° C. for five to seven minutes, then in a vacuum oven at 100° C. for five to seven minutes. The resulting 25-mm wide cathode was placed on a 125 μm thick brass sheet and two 38 mm wide brass shim strips of 87 μm thickness were placed on either side of the cathode to control the gap thickness in the calender. The electrode and shims were covered with a second 125 μm thick brass sheet, and the assembly was passed through a calender three times using 100 mm diameter steel rolls heated to 125° C. with a nip force of 154, 205, and 356 kg, respectively. The cathode was further dried in a vacuum oven at 90° C. at −25 inches of Hg (−85 kPa) for 15 h.

Preparation of a Lithium, Nickel, Manganese Oxide (LNMO) Cathode

The following is a description of a representative preparation of an LNMO Cathode. The LNMO cathode active material, $LiMn_{1.5}Ni_{0.5}O_4$ (NEI Nanomyte™ SP-10, Somerset, N.J.), was ground for ten minutes using an agate mortar and pestle. The ground cathode active material (2.838 g), 0.231 g of Super P Li carbon (Timcal, Switzerland), 1.925 g of polyvinylidene difluoride (PVDF) solution (12 wt % in N-methylpyrrolidone (NMP), Kureha America Inc., New York, N.Y., KFL#1120), and an additional 6.006 g of NMP were mixed first using a planetary centrifugal mixer (THINKY ARE-310, THINKY Corp., Japan) at 2,000 rpm, a shear mixer (VWR, Wilmington, N.C.), and then a planetary centrifugal mixer at 2,000 rpm to form a uniform slurry. The slurry was coated on aluminum foil using a doctor blade, and dried first on a hot plate at 100° C. for five to seven minutes, then in a vacuum oven at 100° C. for five to seven minutes. The resulting electrode was calendered at 125° C. to constant thickness, as described above. The resulting electrode was further dried in a vacuum oven at 90° C. at −25 inches of Hg (−85 kPa) for 15 h.

Preparation of a Lithium Titanate (LTO) Anode

The following is a description of a representative preparation of an LTO anode. The LTO anode active material, $Li_4Ti_5O_{12}$ (NEI Nanomyte™ BE-10, Somerset, N.J.), was ground for ten minutes using an agate mortar and pestle. The ground anode active material (3.168 g), 0.396 g of Super P Li carbon (Timcal, Switzerland), 3.300 g of polyvinylidene difluoride (PVDF) solution (12 wt % in N-methylpyrrolidone (NMP), Kureha America Inc., New York, N.Y., KFL#1120), and an additional 4.136 g of NMP were mixed first using a planetary centrifugal mixer (THINKY ARE-310, THINKY Corp., Japan) at 2,000 rpm, a shear mixer (VWR, Wilmington, N.C.), and then a planetary centrifugal mixer at 2,000 rpm to form a uniform slurry. The slurry was coated on copper foil using a doctor blade, and dried first on a hot plate at 100° C. for five to seven minutes, then in a vacuum oven at 100° C. for five to seven minutes. The resulting electrode was calendered at 125° C. to constant thickness, as described above.

Fabrication of LTO|electrolyte|Fe-LNMO Full Cells

The following is a description of a representative preparation of full cells containing an Fe-LNMO cathode, an LTO anode and an electrolyte composition. Circular anodes 15 mm in diameter and cathodes 14 mm in diameter were punched out, placed in a heater in the antechamber of a glove box, further dried under vacuum at 90° C. for 15 h, and brought in to an argon glove box (Vacuum Atmospheres, Hawthorne, Calif., Nexus purifier). Nonaqueous electrolyte lithium-ion CR2032 coin cells were prepared for electrochemical evaluation. The coin cell parts (stainless steel case, two spacers, wave spring, lid, and polypropylene gasket) and coin cell crimper were obtained from Hohsen Corp (Osaka, Japan). An Fe-LNMO cathode, prepared as described above, a Celgard® separator 2325 (Celgard, LLC. Charlotte, N.C.), an LTO anode, prepared as described above, and a few drops of the nonaqueous electrolyte composition of interest, were assembled to form the LTO/Fe-LNMO full cells.

Fabrication of LTO|electrolyte|LNMO Full Cells

The following is a description of a representative preparation of full cells containing an LNMO cathode, an LTO anode and an electrolyte composition. An LNMO cathode, prepared as described above, a Celgard® separator 2325, an LTO anode, prepared as described above, and a few drops of the nonaqueous electrolyte composition of interest, were sandwiched in 2032 stainless steel coin cell cans to form the LTO↓Fe-LNMO full cells.

Comparative Examples 1-21

High Temperature Performance of Comparative Full Cells

Full cells, containing the anode, cathode, and nonaqueous electrolyte shown in Table 1, were cycled using a commercial battery tester (Series 4000, Maccor, Tulsa, Okla.) in a temperature-controlled chamber at 55° C. using voltage limits of 1.9 to 3.4 V. In one procedure, the constant-current charge and discharge currents for the first two cycles were 12 mA/g of LNMO (about 0.1 C rate), and subsequent cycles were carried out at 120 mA/g of LNMO (about 1 C rate) until T80 was reached. In a second procedure, the constant-current charge and discharge currents were carried out at 120 mA/g of LNMO (about 1 C rate) for 24 cycles at room temperature and then subsequent cycles were carried out at 55° C. until T80 was reached. T80 is defined as the number of cycles before the cell's discharge capacity has been reduced to 80% of the initial discharge capacity at the 1 C rate. The cycle number at which T80 was reached is also shown in Table 1.

TABLE 1

High Temperature Performance of Comparative Full Cells

| Comparative Example | Anode/ Cathode | Electrolyte | Rate | Cycle No. to T80 |
|---|---|---|---|---|
| 1 | LTO/ LNMO | EMC/EC | At 55° C., 2 cycles 12 mA/g, then 120 mA/g | 15 |
| 2 | LTO/ LNMO | EMC/EC + 1% PA-1 | At 55° C., 2 cycles 12 mA/g, then 120 mA/g | 45 |
| 3 | LTO/ LNMO | EMC/EC + 1% PA-2 | At 55° C., 2 cycles 12 mA/g, then 120 mA/g | 74 |
| 4 | LTO/ LNMO | DFEA/EC | 2 cycles 22° C., 13 mA/g; then 55° C. 126 mA/g | 66 |
| 5 | LTO/ Fe-LNMO | EMC/EC | 2 cycles 22° C., 13 mA/g; then 55° C. 129 mA/g | 50 |
| 6 | LTO/ Fe-LNMO | DFEA/EC | 2 cycles 22° C., 13 mA/g; then 55° C. 129 mA/g | 51 |
| 7 | LTO/ Fe-LNMO | EMC/EC + 1% PA-6 | At 55° C., 2 cycles 12 mA/g, then 120 mA/g | 33 |
| 8 | LTO/ Fe-LNMO | EMC/EC + 1% PA-7 | At 55° C., 2 cycles 12 mA/g, then 120 mA/g | 14 |
| 9 | LTO/ Fe-LNMO | EMC/EC + 1% PA-8 | At 55° C., 2 cycles 12 mA/g, then 120 mA/g | 15 |
| 10 | LTO/ Fe-LNMO | EMC/EC + 1% PA-10 | At 55° C., 2 cycles 12 mA/g, then 120 mA/g | 64 |
| 11 | LTO/ Fe-LNMO | EMC/EC + 1% PA-13 | At 55° C., 2 cycles 12 mA/g, then 120 mA/g | 30 |
| 12 | LTO/ Fe-LNMO | EMC/EC + 1% PA-14 | At 55° C., 2 cycles 12 mA/g, then 120 mA/g | 86 |
| 13 | LTO/ Fe-LNMO | EMC/EC + 1% PA-16 | At 55° C., 2 cycles 12 mA/g, then 120 mA/g | 61 |
| 14 | LTO/ Fe-LNMO | DFEA/EC + 1% PA-6 | At 55° C., 2 cycles 12 mA/g, then 120 mA/g | 22 |
| 15 | LTO/ Fe-LNMO | DFEA/EC + 1% PA-7 | At 55° C., 2 cycles 12 mA/g, then 120 mA/g | 13 |
| 16 | LTO/ Fe-LNMO | DFEA/EC + 1% PA-8 | At 55° C., 2 cycles 12 mA/g, then 120 mA/g | 16 |
| 17 | LTO/ Fe-LNMO | DFEA/EC + 1% PA-13 | At 55° C., 2 cycles 12 mA/g, then 120 mA/g | 32 |
| 18 | LTO/ Fe-LNMO | DFEA/EC + 1% PA-16 | At 55° C., 2 cycles 12 mA/g, then 120 mA/g | 9 |
| 19 | LTO/ Fe-LNMO | EMC/EC | 24 cycles at RT, then at 55° C., 120 mA/g | 493 |
| 20 | LTO/ Fe-LNMO | DFEA/EC | 24 cycles at RT, then at 55° C., 120 mA/g | 650 |
| 21 | LTO/ Fe-LNMO | DFEP/EC | 24 cycles at RT, then at 55° C., 120 mA/g | 483 |

Examples 1-20

High Temperature Performance of Full Cells

Full cells, containing the anode, cathode, and nonaqueous electrolyte shown in Table 2, were cycled between 1.9 and 3.4 V at the rate shown in Table 2 at 55° C. until T80 was reached. The cycle number at which T80 was reached is also shown in Table 2. As can be seen by comparing the cycle numbers in Table 2 with those in Table 1 (Comparative Examples), the addition of the phosphate additive and the use of a stabilized manganese cathode resulted in higher cycle numbers.

TABLE 2

High Temperature Performance of Full Cells

| Example | Anode/ Cathode | Electrolyte | Rate | Cycle No. to T80 |
|---|---|---|---|---|
| 1 | LTO/ Fe-LNMO | EMC/EC + 1% PA-1 | At 55° C., 2 cycles 12 mA/g, then 120 mA/g | 132 |
| 2 | LTO/ Fe-LNMO | EMC/EC + 1% PA-2 | At 55° C., 2 cycles 12 mA/g, then 120 mA/g | 154 |
| 3 | LTO/ Fe-LNMO | EMC/EC + 1% PA-3 | At 55° C., 2 cycles 12 mA/g, then 120 mA/g | 153 |
| 4 | LTO/ Fe-LNMO | EMC/EC + 1% PA-4 | At 55° C., 2 cycles 12 mA/g, then 120 mA/g | 118 |
| 5 | LTO/ Fe-LNMO | EMC/EC + 1% PA-9 | At 55° C., 2 cycles 12 mA/g, then 120 mA/g | 180 |
| 6 | LTO/ Fe-LNMO | EMC/EC + 1% PA-11 | At 55° C., 2 cycles 12 mA/g, then 120 mA/g | 178 |
| 7 | LTO/ Fe-LNMO | DFEA/EC + 1% PA-1 | At 55° C., 2 cycles 12 mA/g, then 120 mA/g | 114 |
| 8 | LTO/ Fe-LNMO | DFEA/EC + 1% PA-2 | At 55° C., 2 cycles 12 mA/g, then 120 mA/g | 45 |
| 9 | LTO/ Fe-LNMO | DFEA/EC + 1% PA-9 | At 55° C., 2 cycles 12 mA/g, then 120 mA/g | 153 |
| 10 | LTO/ Fe-LNMO | DFEP/EC + 1% PA-1 | At 55° C., 2 cycles 12 mA/g, then 120 mA/g | 171 |
| 11 | LTO/ Fe-LNMO | DFEP/EC + 1% PA-5 | At 55° C., 2 cycles 12 mA/g, then 120 mA/g | 122 |
| 12 | LTO/ Fe-LNMO | DFEP/EC + 1% PA-9 | At 55° C., 2 cycles 12 mA/g, then 120 mA/g | 173 |
| 13 | LTO/ Fe-LNMO | EMC/EC + 1% PA-17 | At 55° C., 2 cycles 12 mA/g, then 120 mA/g | 20 |
| 14 | LTO/ Fe-LNMO | EMC/EC + 1% PA-18 | At 55° C., 2 cycles 12 mA/g, then 120 mA/g | 108 |
| 15 | LTO/ Fe-LNMO | DFEA/EC + 1% PA-18 | At 55° C., 2 cycles 12 mA/g, then 120 mA/g | 75 |
| 16 | LTO/ Fe-LNMO | EMC/EC + 1% PA-19 | At 55° C., 2 cycles 12 mA/g, then 120 mA/g | 127 |
| 17 | LTO/ Fe-LNMO | DFEA/EC + 1% PA-19 | At 55° C., 2 cycles 12 mA/g, then 120 mA/g | 88 |
| 18 | LTO/ Fe-LNMO | EMC/EC + PA-5 | 24 cycles at RT, then at 55° C., 120 mA/g | 522 |
| 19 | LTO/ Fe-LNMO | DFEA/EC + PA-5 | 24 cycles at RT, then at 55° C., 120 mA/g | 825 |
| 20 | LTO/ Fe-LNMO | DFEP/EC + PA-5 | 24 cycles at RT, then at 55° C., 120 mA/g | 600 |

What is claimed is:
1. A lithium ion battery comprising:
a) a stabilized manganese cathode comprising:
  a lithium-containing manganese composite oxide having a spinel structure as active material, the lithium-containing manganese composite oxide being represented by the formula:

$Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18, and d is 0 to 0.3;
b) an anode;
c) a porous separator between said anode and said cathode;
d) a nonaqueous electrolyte composition providing an ionically conductive pathway between said anode and said cathode, wherein said electrolyte comprises:
(i) a solvent mixture comprising:
(A) ethylene carbonate at about 10% to about 40% by weight;
(B) at least one fluorine-containing carboxylic acid ester selected from the group consisting of CH$_3$—COO—CH$_2$CF$_2$H, CH$_3$CH$_2$—COO—CH$_2$CF$_2$H, F$_2$CHCH$_2$—COO—CH$_3$, F$_2$CHCH$_2$—COO—CH$_2$CH$_3$, CH$_3$—COO—CH$_2$CH$_2$CF$_2$H, CH$_3$CH$_2$—COO—CH$_2$CH$_2$CF$_2$H, and F$_2$CHCH$_2$CH$_2$—COO—CH$_2$CH$_3$ at about 20% to about 80% by weight; and
(C) at least one phosphate additive at about 0.2% to about 10% by weight, said at least one phosphate additive represented by the formula:

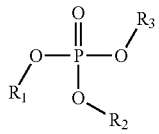

wherein R$_1$, R$_2$, and R$_3$ are each independently normal or branched C1 to C10 alkyl or fluoroalkyl, C3 to C10 cyclic alkyl, C2 to C10 ether, C2 to C10 ether wherein at least one of the hydrogens is replaced with a fluorine, R$_1$ and R$_2$, R$_2$ and R$_3$, or R$_1$ and R$_3$ may be joined to form a ring; and
(ii) at least one electrolyte salt.

2. The lithium ion battery of claim 1, wherein the electrolyte composition further comprises 4-fluoroethylene carbonate at a concentration of about 0.5% to about 2% by weight.

3. The lithium ion battery of claim 1, wherein the solvent mixture comprises ethylene carbonate and CH$_3$—COO—CH$_2$CF$_2$H, or CH$_3$CH$_2$—COO—CH$_2$CF$_2$H at a weight ratio of about 30:70 and the phosphate additive at about 1% by weight.

4. The lithium ion battery of claim 1, wherein the phosphate additive is selected from the group consisting of tris(1,1,1,3,3,3-hexafluoropropan-2yl) phosphate, tris(2,2,2-trifluoroethyl) phosphate, tri(2,2,3,3,3-pentafluoropropyl) phosphate, tris(2,2,3,3-tetrafluoropropyl) phosphate, triethyl phosphate, trimethyl phosphate, tripropyl phosphate, triphenyl phosphate, triisopropyl phosphate, tris(2,2,3,3,4,4,5,5,6,6-decafluorohexyl) phosphate, and tris(2,2-difluoroethyl) phosphate.

5. The lithium ion battery of claim 1, wherein the anode is lithium titanate or graphite.

6. The lithium ion battery of claim 1, wherein y is 0.38 to 0.48, z is 0.03 to 0.12, and d is 0 to 0.1.

7. The lithium ion battery of claim 1, wherein M is one or more of Li, Cr, Fe, Co, and Ga.

8. An electronic device that comprises a lithium ion battery according to claim 1.

9. A lithium ion battery comprising:
a) a stabilized manganese cathode comprising:
a lithium-containing manganese composite oxide having a spinel structure as active material, the lithium-containing manganese composite oxide being represented by the formula:

wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18, and d is 0 to 0.3;
b) an anode;
c) a porous separator between said anode and said cathode;
d) a nonaqueous electrolyte composition providing an ionically conductive pathway between said anode and said cathode, wherein said electrolyte comprises:
(i) a solvent mixture comprising:
(A) ethylene carbonate at about 15% to about 40% by weight;
(B) at least one fluorine-containing carboxylic acid ester selected from the group consisting of CH$_3$—COO—CH$_2$CF$_2$H, CH$_3$CH$_2$—COO—CH$_2$CF$_2$H, F$_2$CHCH$_2$—COO—CH$_3$, F$_2$CHCH$_2$—COO—CH$_2$CH$_3$, CH$_3$—COO—CH$_2$CH$_2$CF$_2$H, CH$_3$CH$_2$—COO—CH$_2$CH$_2$CF$_2$H, and F$_2$CHCH$_2$CH$_2$—COO—CH$_2$CH$_3$ at about 40% to about 80% by weight; and
(C) at least one phosphate additive at about 0.5% to about 5% by weight, said at least one phosphate additive represented by the formula:

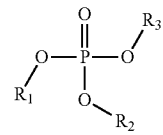

wherein R$_1$, R$_2$, and R$_3$ are each independently normal or branched C1 to C10 alkyl or fluoroalkyl, C3 to C10 cyclic alkyl, C2 to C10 ether, C2 to C10 ether wherein at least one of the hydrogens is replaced with a fluorine, R$_1$ and R$_2$, R$_2$ and R$_3$, or R$_1$ and R$_3$ may be joined to form a ring; and
(ii) at least one electrolyte salt.

10. The lithium ion battery of claim 9, wherein the electrolyte composition further comprises 4-fluoroethylene carbonate at a concentration of about 0.5% to about 2% by weight.

11. The lithium ion battery of claim 9, wherein the solvent mixture comprises ethylene carbonate and CH$_3$—COO—CH$_2$CF$_2$H, or CH$_3$CH$_2$—COO—CH$_2$CF$_2$H at a weight ratio of about 30:70 and the phosphate additive at about 1% by weight.

12. The lithium ion battery of claim 9, wherein the phosphate additive is selected from the group consisting of tris(1,1,1,3,3,3-hexafluoropropan-2yl) phosphate, tris(2,2,2-trifluoroethyl) phosphate, tri(2,2,3,3,3-pentafluoropropyl) phosphate, tris(2,2,3,3-tetrafluoropropyl) phosphate, triethyl phosphate, trimethyl phosphate, tripropyl phosphate, triphenyl phosphate, triisopropyl phosphate, tris(2,2,3,3,4,4,5,5,6,6-decafluorohexyl) phosphate, and tris(2,2-difluoroethyl) phosphate.

13. The lithium ion battery of claim 9, wherein the anode is lithium titanate or graphite.

14. The lithium ion battery of claim 9, wherein y is 0.38 to 0.48, z is 0.03 to 0.12, and d is 0 to 0.1.

15. The lithium ion battery of claim 9, wherein M is one or more of Li, Cr, Fe, Co, and Ga.

16. An electronic device that comprises a lithium ion battery according to claim 9.

* * * * *